Patented Feb. 27, 1923.

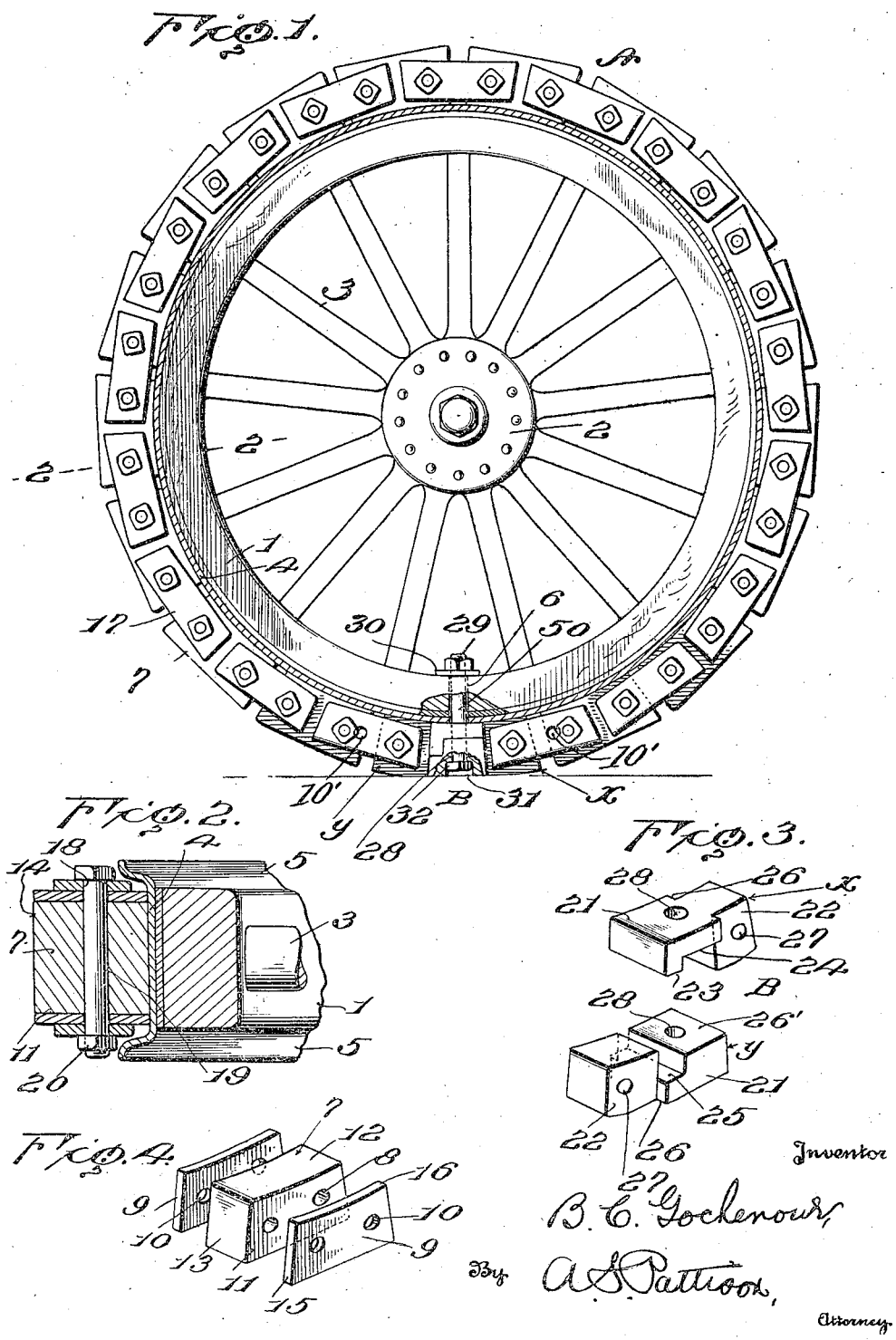

1,447,072

UNITED STATES PATENT OFFICE.

BENJAMIN C. GOCHENOUR, OF SPOKANE, WASHINGTON.

EMERGENCY TIRE.

Application filed December 21, 1921. Serial No. 523,866.

*To all whom it may concern:*

Be it known that I, BENJAMIN C. GOCHENOUR, a citizen of the United States, residing at Spokane, in the county of Spokane and State of Washington, have invented certain new and useful Improvements in Emergency Tires, of which the following is a specification, reference being had therein to the accompanying drawing.

My invention relates to improvements in emergency tires of a nature adapted to be readily attached to a wheel rim to replace the pneumatic tire.

The object of my invention is to provide an emergency tire which can be quickly and easily attached to and detached from a wheel rim of an automobile wheel when running the automobile without the pneumatic tire, because of a puncture, blow-out or the like.

A further object of my invention is to provide an emergency tire which will be simple and inexpensive of manufacture and efficient of operation.

A further object of my invention is to provide an emergency tire to replace the ordinary pneumatic tire for the purpose of saving the pneumatic tire when the automobile is about to be driven up steep and slippery hills and which in addition to saving the pneumatic tire performs the function of an armored tire for giving additional traction.

Other further objects and improved results of my invention will appear from the following specification and accompanying drawings.

In the drawings:—

Fig. 1 is a side view of a wheel with my improved emergency tire applied thereto, a portion of the figure appearing in section to show the securing means for the tire.

Fig. 2 is a fragmental transverse vertical sectional view through a wheel rim having applied thereto my emergency tire.

Fig. 3 is a detailed perspective view of the connection joint used in connecting the two ends of the tire, the parts being shown in separated relation.

Fig. 4 is a detailed perspective view of several parts of my improved emergency tire, the parts being shown in separated relation.

Referring now to the drawings in which like parts are designated by similar reference numerals throughout the description, 1 represents the felly of a wheel which consists of the hub 2 and the usual wood or wire spokes 3. The wheel felly 1 is provided with a rim 4 of any desired type, the type shown here has at either edge of the rim the upturned lip or edge 5 extending around its entire circumference. The wheel felly and rim are provided with the usual valve opening 6 which is common to the construction of a wheel adapted to carry pneumatic tire, and the openings of the felly and the rim are adapted to register, as clearly appears in Fig. 1 of the drawings.

Referring now to my emergency tire which is adapted to be readily applied to the rim 4 of the wheel to replace the usual pneumatic tire carried by the wheel which is necessarily removable when the same is flat because of a puncture or blow-out, this emergency tire is designated at A.

The emergency tire A consists of a plurality of what I have termed center blocks 7, provided adjacent each of its ends with openings 8. Each center block is provided with two braces 9 which are of a length and height similar to the center block 7 and are provided with openings 10 adjacent their ends. The braces 9 are adapted to lie against the sides 11 of the center block with the openings of the braces and the center block registering. The bottom 12 of the center block is slightly concave, the purpose of which will be later explained, while the ends 13 of the center block are beveled slightly inwardly from the top 14 of the block, as clearly appears in the drawings and the purpose of which will be hereafter described.

The braces 9, in like manner to the center block 7 have their ends 15 beveled inwardly and their bottom edges 16 slightly concaved.

The several center blocks 7 and their braces 9 are joined together by a plurality of linked members 17 which are similar as to configuration with the braces 9, being provided with openings 18 adjacent their ends and suitable bolts 19 provided with nuts 20 pass through the openings 18, 10 and 8 of the links, braces, and center blocks respectively to hold them together.

The two free ends of the emergency tire composed of the plurality of center blocks, braces, and links, are joined together by an interlocking fastening B. This fastening consists of two members $x$ and $y$.

The two parts $x$ and $y$ which compose the block fastening B are each composed of an interlocking portion 21 and a block portion 22. The interlocking portions 21 of the fastening members *x* and *y* are of a width equal to the width of the combined center block 7, braces 9 and link members 17. The interlocking portion of the fastening member *x* is provided with a raised portion 23 and a depressed portion 24 which are adapted to interlock respectively with a depressed portion 25 and a raised portion 26 of the fastening member *y*. When the interlocking portions of the fastening members *x* and *y* are assembled, as appears in Figure 1 of the drawings, the thickness of the block fastening B is the same as the thickness or height of the center blocks 7. It will also appear that when the interlocked portions of the block fastening B are assembled that the block portions 22 of the fastening members *x* and *y* form extensions at either end of the interlocked portions. The block extension portions 22 are reduced in width at either side, as appears at 26, an amount approximately equal to the thickness of the links 17. The block portions 22 of the block fastening B are provided with transverse openings 27 which are adapted to be registered with the openings 18 in one end of the links 17. The links 17 are fastened to the block portions 22 of the block fastening B by suitable bolts 19, before referred to, which are provided with nuts 20. The interlocking portions 21 of the fastening members *x* and *y* are provided with openings 28 which register when the portions are in assembled position and through which is passed the bolt 50. The bolt 50 extends also through the openings in the rim 4 and felly 1 of the wheel and is fastened on the inner side of the felly by means of the nut 29 which clamps down upon the washer 30 and the inner side of the wheel felly 1. The interlocking portion 21 of the outer member *y* of the block fastening B is provided with a depression 31 in its outer face in which is seated the head 32 of the bolt 50. The inner face of the fastening member *x* is slightly concave, as shown, the reason for which will be later explained.

The assembling of my improved emergency tire is accomplished by fastening a plurality of center blocks 7 and braces 9, and joining them at their sides by the links 17. The members *x* and *y* of the block fastening are fixed each to one end of the string of previously assembled center blocks. With the device in this form it is placed in the rim 4 of wheel and the interlocking portions 21 of the fastening members *x* and *y* are made to register, at which time the bolt 50 is passed through the fastening members *x* and *y* and the rim 4 and felly 1 of the wheel. The washer 30 and the nut 29 are then placed on the bolt 50 and tightened downwardly. With the nut 29 tightly clamped, the emergency tire will then be securely in place on the rim 4 of the wheel.

Attention is directed to the fact that the complete width of the emergency tire is such as to snugly fit within the rim 4, as clearly appears in Figure 2 of the drawings, the bolts 19 of the emergency tire being above the lip or edge 5 of the rim. Because of the fact that the inner face of all the elements of the emergency tire which engage the bottom of the rim 4 of the wheel are slightly concaved, the emergency tire rests snugly upon the rim 4 and more perfectly assumes the circular contour of the wheel and rim. Because of the fact that all the center blocks of the emergency tire and its block fastening B are pivotally connected, the tire is able to assume the circular contour of the wheel and rim and is also facilitated in adapting itself to the contour of the wheel and rim and allowed free working in the rim because of the beveled edges of the blocks, braces and links.

The operation of my device is as follows:—

My emergency tire is adapted to be attached to the wheel at those times when because of a blow-out, puncture or the like, it is necessary to run on the wheel rim or to ruin a tire by running upon the same when it is flat. With the pneumatic tire removed from the wheel rim my device is applied thereto. My emergency tire is carried completely assembled and is very easily and simply applied to the wheel rim by simply bolting it to the wheel and rim by means of the bolt 50. In applying the tire to the wheel rim it is necessary to break the connection of the interlocking portions 21 of the fastening members *x* and *y* and then simply wrapping the tire around the rim. With the tire wrapped around the rim the interlocking portions are assembled and the tire locked or bolted in place by means of the bolt 50 and nut 29.

As will be readily understood my tire provides a means of running to the nearest place where the pneumatic tire, which has been removed, can be repaired or a new pneumatic tire obtained. It will also readily appear that when traction cannot be obtained by a pneumatic tire the pneumatic tire can be replaced by my emergency tire which will afford better traction.

No special material from which my tire is constructed has been designated, as it will be readily understood that iron, wood, fibre or some other suitable material can be equally well used. I have found that wood center blocks and block fastening together with iron braces and links is preferable in use. When using wood center blocks I have also discovered that it is sometimes desirable to cover the outer face of the block with metal or to cap the same with metal as the wood blocks yield to pressure which has a tendency to lengthen the tire and make the same loose on the wheel rim. However, it will be readily understood that the material from which the tire is constructed forms no part of this invention and that any material desired can be used.

To provide a means of taking up slack in the tire if the same should become loose upon the wheel rim, I have provided the links 17 adjacent the block fastening with additional openings 10'. These openings provide a means of tightening the tire upon the wheel rim when the slack in the tire is not sufficient to entirely remove one of the center blocks. It will be readily understood that if it were desirable that all the links 17 of the tire could be provided with these openings 10' so that a large field of adjustment would be provided.

Having thus described my invention what I desire to secure and protect by Letters Patent is:

1. An emergency tire comprising, a plurality of center blocks, a fastening comprising two interlocking block members, and links pivotally connecting the center blocks and the fastening.

2. An emergency tire comprising, a plurality of center blocks, braces for the center blocks, a fastening comprising two interlocking block members, and links pivotally connecting the center blocks and braces to the interlocking block fastening members.

3. An emergency tire comprising, a plurality of center blocks, a fastening, links pivotally connecting the center blocks and fastening, and the fastening comprising two blocks adapted to interlock one with the other.

4. An emergency tire comprising, a plurality of center blocks, braces for each side of the center blocks, links pivotally connecting the blocks and their braces, a fastening comprising two interlocking block members, and two of the center blocks pivotally connected to the fastening members, for the purpose described.

5. An emergency tire comprising, a plurality of center blocks, braces for the center blocks, links pivotally connecting the center blocks and braces into a chain of blocks and braces, and a two part interlocking fastening pivotally connected to the two ends of the chain of blocks and braces, for the purpose described.

6. An emergency tire comprising, a plurality of center blocks, a fastening, links pivotally connecting the center blocks and fastening to form a chain, and the fastening comprising two block members composed of interlocking portions and extending block portions, for the purpose described.

7. An emergency tire adapted for connection with a wheel rim comprising, a plurality of center blocks, a fastening, links pivotally connecting the center blocks and the fastening to form a chain, the fastening comprising two interlocking portions adapted to be bolted to the wheel, whereby the tire is held in position upon the rim.

8. An emergency tire comprising, a plurality of center blocks, braces on each side of the center blocks, a fastening, links pivotally connecting the center blocks and their braces to the fastening, and the ends of the blocks and their braces and the links beveled, for the purpose described.

9. An emergency tire comprising, a plurality of center blocks, a fastening, links pivotally connecting the center blocks and the fastening to form a chain, the fastening comprising two blocks adapted to interlock one with the other, and means carried by the link connections whereby the chain of blocks can be shortened.

10. An emergency tire comprising, a plurality of center blocks, a fastening, links pivotally connecting the center blocks and the fastening to form a chain, and the fastening comprising two members composed of interlocking portions provided with extending block portions of a less width than their interlocking parts, for the purpose described.

11. An emergency tire comprising, a plurality of center blocks, a fastening, links pivotally connecting the center blocks and the fastening to form a chain, and the fastening comprising two members composed of interlocking portions having extending block portions provided with transverse openings, for the purpose described.

In testimony whereof I hereunto affix my signature.

BENJAMIN C. GOCHENOUR.